US012048297B2

(12) United States Patent
Xiao et al.

(10) Patent No.: US 12,048,297 B2
(45) Date of Patent: Jul. 30, 2024

(54) PET KETTLE

(71) Applicants: LesoRocity (Shenzhen) Industrial Co., Ltd, Guangdong (CN); Shenzhen Rongcheng Innovation Technology Co., LTD, Guangdong (CN)

(72) Inventors: Weijun Xiao, Shenzhen (CN); Fangjian Zhang, Shenzhen (CN)

(73) Assignees: LesoRocity (Shenzhen) Industrial Co., Ltd, Guangdong (CN); Shenzhen Rongcheng Innovation Technology Co., LTD, Guangdong (CN)

( * ) Notice: Subject to any disclaimer, the term of this patent is extended or adjusted under 35 U.S.C. 154(b) by 110 days.

(21) Appl. No.: 17/902,780

(22) Filed: Sep. 2, 2022

(65) Prior Publication Data
US 2023/0121870 A1    Apr. 20, 2023

(30) Foreign Application Priority Data

Oct. 18, 2021 (CN) .......................... 202111209042.2

(51) Int. Cl.
*A01K 7/00* (2006.01)

(52) U.S. Cl.
CPC ..................................... *A01K 7/00* (2013.01)

(58) Field of Classification Search
CPC . A01K 7/00; A01K 7/005; A01K 7/02; B67D 3/043; B67D 3/045; B67D 3/0035; B67D 3/0054; B67D 3/0061
USPC ........................................................... 119/74
See application file for complete search history.

(56) References Cited

U.S. PATENT DOCUMENTS

| | | | | |
|---|---|---|---|---|
| 2,762,333 A * | 9/1956 | Smith | ....................... | A01K 7/02 119/81 |
| 6,843,205 B1 * | 1/2005 | Segreto | ................ | A01K 5/0114 119/515 |
| 10,244,734 B1 * | 4/2019 | Riley | ........................ | A01K 5/02 |
| 11,021,298 B2 * | 6/2021 | Williams | ............... | B65D 25/20 |
| 2006/0102628 A1 * | 5/2006 | Hage | .......................... | A01K 7/06 220/709 |
| 2009/0255956 A1 * | 10/2009 | Lassota | ................. | B67D 3/0061 222/510 |
| 2010/0116213 A1 * | 5/2010 | Cahill | ..................... | A01K 7/005 119/72.5 |

FOREIGN PATENT DOCUMENTS

CN   108935162 A * 12/2018   ............. A01K 5/004
EP   3800160 A1 * 4/2021
(Continued)

OTHER PUBLICATIONS

Lesotc, Dog Water Bowl Dispenser, Travel Dog Bowls for Camping Dog Park Hunting, Aug. 10, 2020, Amazon; https://www.amazon.com/lesotc-Portable-Dispenser-Pull-Out-Drinking/dp/B09B4YTZKM/ref=pd_lpo_sccl_1/139-1305472-8354361?pd_rd_w=Np6NI&content-id=amzn1.sym.1ad2066f-97d2-4731-9356-36b3edf1ae04&pf_rd_p=1ad2066f-97d2-4731-9356-36b3edf1ae04&pf_rd_r=ZFBKX399JQXTRZD79XKQ&pd_rd_wg=USwXc&pd_rd_r=f13a2ff9-2036-4c2a-a9f1-0fd027ca2376&pd_rd_i=B09B4YTZKM&th=1 (Year: 2020).*

*Primary Examiner* — Tien Q Dinh
*Assistant Examiner* — Erica Michelle Huebner
(74) *Attorney, Agent, or Firm* — Ying-Ting Chen (57) ABSTRACT

A pet kettle includes a bottle body, an object holding tray and a switch unit. The bottle body includes a tray groove allowing the object holding tray to be movably placed, and a water outlet channel arranged toward the tray groove. The switch unit is adapted to be switched to an open state or a (Continued)

closed state to control the water outlet channel to be opened or closed.

2 Claims, 4 Drawing Sheets

(56) References Cited

FOREIGN PATENT DOCUMENTS

| | | | |
|---|---|---|---|
| KR | 200415151 Y1 * | 4/2006 | |
| KR | 20100004143 A * | 1/2010 | |
| WO | WO-2006006160 A1 * | 1/2006 | ........... B67D 3/0035 |

* cited by examiner

PET KETTLE

BACKGROUND OF THE PRESENT INVENTION

Field of Invention

The present invention relates to a field of pet product, and in particular, to a pet kettle.

Description of Related Arts

With the continuous improvement of people's living standards, keeping pets has become more and more popular, and a variety of pet products have been launched on the market. Among them, water is a necessity for pets to survive, and water utensils for pets to drink water have become one of the indispensable tools for raising pets. Traditionally, pet owners usually use ordinary water bowls to hold water for their pets to drink. However, due to the limited water capacity of ordinary water bowls, pet owners need to add water from time to time to prevent pets from drinking insufficient water, and ordinary water bowls are easily contaminated with dust that causes water pollution. Therefore, pet owners often need to replace the water in the water bowl and clean the water bowl to ensure the pet's drinking water hygiene, costing the pet owner a lot of extra energy on the pet's drinking water.

When pet owners go out to play with pets, pets also need to drink water in time. Unfortunately, water bowl is very unfriendly to storage and transportation; it is difficult to carry a water bowl with water, and after the water bowl is filled with water, the surface of the water bowl will become wet and difficult to be placed in a backpack. Further, the shape of a water bowl also results in that the water bowl only has the function of holding water and cannot store water for pet owners to carry with it, so that it very inconvenient for pet owners to carry additional water storage appliances, such as kettles and water bottles, when using water bowls for pets to drink water outdoors.

In response to this, the pet drinking devices with a unified design of water bowls and water bottles have appeared on the market to facilitate pet owners to water their pets. Specifically, most of the conventional pet drinking devices simply integrate the water bowl and the water bottle. For example, the water bowl is designed as the lid of a water bottle, so that the pet owner can unscrew the lid of the water bottle to separate the water bowl from the water bottle and pours the water stored in the water bottle into the water bowl for the pet to drink. The conventional pet drinking water device improves the pet drinking water problem to a certain extent, especially the outdoor drinking water problem for pets.

Unfortunately, although the conventional pet drinking devices improves the pet's drinking water problem to a certain extent, the conventional pet drinking devices that simply integrate the water bowl and the water bottle is still very inconvenient for carrying and transportation. Specifically, in order to maintain the amount of water at one time, the water bowl in the conventional pet drinking devices usually adopts a large-volume water bowl, which causes the water bowl to be abruptly designed on the water bottle and becomes very inconvenient to carry. On the other hand, in the process of supplying water, the pet owner needs to tilt the water bottle with the water stored in it to allow the water to flow out under the action of gravity. However, when raising large pets, it is usually necessary to use a large-volume water bottle to store water to meet the pet's drinking needs, which leads to excessive weight when the water bottle is full of water. As a result, it is difficult for pet owners to keep the water bottle tilted and therefore fail to pour water, or it is easy to cause too much water to be poured at one time, rendering water waste. At the same time, when the water bowl is separated from the water bottle, the water bowl is light and easy to be knocked over by pets, causing the water contained in the water bowl to be wasted and the water bowl to become dirty. In addition, in the process of using the conventional pet drinking device, the pet owner will inevitably directly contact the water bowl, when unscrewing the water bowl, and the water when supplying water, which leads to the transmission of bacteria or other harmful substances to the pet through the pet owner, and vice versa, in the drinking process of the pet, the oral secretions of pets will remain in the water bowl to breed bacteria, which will then be transmitted to the pet owner when the pet owner touches the water bowl, thereby increasing the health risk of pets and pet owners.

In other words, conventional water bowls are difficult to meet the watering needs, especially outdoor watering needs, for pets. Although the conventional pet drinking devices improves the shortcomings of conventional water bowl to a certain extent, there are still problems in inconvenience of carrying and utilizing, as well as the hygienic problems, which increases health risks for both the pets and the pet owners through utilizing the conventional pet drinking devices.

SUMMARY OF THE PRESENT INVENTION

An object of the present invention is to provide a pet kettle, wherein a water holding mechanism of the pet kettle adopts a concealed design, which is convenient for carrying and transportation of the pet kettle, and gives the pet breeders a good user experience.

Another object of the present invention is to provide a pet kettle, wherein the pet kettle does not need to be tilted to pour water, so as to avoid the pet breeders spending a lot of physical strength in performing water pouring operations, which makes the utilizing of the pet kettle easy and saves the energy of pet breeders.

Another object of the present invention is to provide a pet kettle, wherein the pet kettle prevents the pet breeders from directly contacting the water stored in the pet kettle during the process of supplying water, thereby reducing the health risks of pets and pet breeders.

Another object of the present invention is to provide a pet kettle, wherein the pet kettle includes a bottle body, wherein the bottle body has a cavity and an opening communicating the cavity with the outside, so that the cavity of the bottle body may be utilized to store articles, such as drinking water for pets, through the opening, and at the same time, it is beneficial to clean the cavity through the opening, so as to maintain the hygienic state of the pet kettle.

Another object of the present invention is to provide a pet kettle, wherein the bottle body includes a bottle cap matched with the opening, so that the cavity of the bottle body may be switched between a sealed state and a communication state with the outside through the bottle cap. In this way, when the cavity is in the sealed state, it is utilized to store articles and prevent the articles from being polluted by external dust, so as to ensure the hygiene of the articles stored in the cavity, and when the cavity is in the communication state with the outside, it is adapted for cleaning the cavity or storing articles; for example, the pet's drinking water is poured into the cavity when the cavity is in the communication state with the outside.

Another object of the present invention is to provide a pet kettle, wherein the opening of the bottle body includes an opening connecting portion surroundingly disposed near and around the opening, wherein the bottle cap includes a bottle cap connecting portion matched the opening connecting portion, wherein the bottle cap connecting portion of the bottle cap is adapted to be detachably attached to the opening connecting portion of the opening. In this way, when the bottle cap connecting portion and the opening connecting portion are detachably attached, the articles stored in the cavity are prevented from leaking through the opening.

Another object of the present invention is to provide a pet kettle, wherein the pet kettle further comprises an object holding tray, wherein the object holding tray is designed in a concealed manner in the pet kettle, so as to facilitate the carrying and transportation of the pet kettle.

Another object of the present invention is to provide a pet kettle, wherein the bottle body further includes a tray groove arranged therein, wherein the object holding tray is movably placed in the tray groove, and specifically, the object holding tray is allowed to move along the tray groove. In other words, when the pet kettle is in a use state, the object holding tray is allowed to be partially drawn out from the tray groove, and when the pet kettle is in a non-use state, the object holding tray is allowed to be pushed into the tray groove, so as to prevent the object holding tray from being polluted by dust and bacteria due to being directly exposed to the external environment, and to reduce the floor space of the pet kettle at the same time, thereby facilitating the storage the pet kettle and the carrying and transportation of the pet kettle by the pet breeder.

Another object of the present invention is to provide a pet kettle, wherein the object holding tray is located in the tray groove, so that the object holding tray is coupled with the bottle body, so as to prevent the object holding tray from being knocked over by pets and causing the articles in the object holding tray, such as pet drinking water or pet food, to be contaminated and wasted, which facilitates maintaining the hygiene of the object holding tray.

Another object of the present invention is to provide a pet kettle, wherein the bottle body further comprises a water outlet channel arranged towards the direction of the tray groove, so that the liquid stored in the cavity can flow into the object holding tray placed in the tray groove through the water outlet channel for the pet to drink.

Another object of the present invention is to provide a pet kettle, wherein the pet kettle further comprises a switch unit disposed on the bottle body, wherein the switch unit is adapted to be switched to an open state or a closed state to control the water outlet channel to be opened or closed, so that the water outlet channel is allowed or prohibited the flow of water, which realizes the control of water pouring by the pet breeder.

Another object of the present invention is to provide a pet kettle, wherein the switch unit includes a force receiving rod, a transmission arm, a lever arm, and a channel rod, wherein both ends of the lever arm are respectively connected with the transmission arm and the channel rod, wherein the lever arm has a first connection end connected with an end of the transmission arm, and a second connection end corresponding to the first connection end, wherein the water outlet channel has an inner opening facing one end of the cavity, wherein the channel rod includes a piston arranged thereon, wherein the channel rod is located in the water outlet channel, wherein when the switch unit is in the closed state, the piston is located in the inner port to close the inner port, so as to close the water outlet channel, wherein when the switch unit is switched to the open state, the force receiving rod moves in the direction toward the tray groove and then drives the transmission arm to move in the same direction. In response, the first connection end of the lever arm moves with the transmission arm, and then the second connection end moves in the direction away from the tray groove to drives the channel rod, so that the piston moves in the direction away from the inner port, so as to open the water outlet channel.

Another object of the present invention is to provide a pet kettle, wherein the switch unit includes a button connected to an end of the force receiving rod, so that the pet breeder may apply external force to the force receiving rod through the button, in order to move the force receiving rod to control the opening of the water outlet channel.

Another object of the present invention is to provide a pet kettle, wherein the bottle cap includes a pressing groove, wherein the button is arranged in the pressing groove, wherein the pressing groove has a pressing groove bottom, so that the pressing depth of the button is adjustable based on the given depth of the pressing groove, so as to realize the control of the movement extend of the force receiving rod, thereby controlling the moving distance of the piston away from the inner port.

Another object of the present invention is to provide a pet kettle, wherein the bottle cap further comprises a button cover adapted for shielding the button, so as to prevent the button from being accidentally touched and the water outlet channel to be opened, which further facilitates the carrying and transportation of the pet kettle.

Another object of the present invention is to provide a pet kettle, wherein the pressing groove bottom has a through hole arranged thereon, so that the force receiving rod is connected with the button through the through hole, so that the pet breeder may exert an external force to the force receiving rod through the button, in order to move the force receiving rod to control the opening of the water outlet channel.

Another object of the present invention is to provide a pet kettle, wherein the switch unit further comprises a button return member disposed at the pressing groove bottom and abutting against the button, wherein in the state that the button is moved toward the direction close to the pressing groove bottom due to an external force, the button return member is squeezed, and then in the state that the button loses the corresponding external force, the button return member returns to an original state and push the button to move in the direction away from the pressing groove bottom, so that the button is returned to an original position, thereby driving the force receiving rod to move.

Another object of the present invention is to provide a pet kettle, wherein the water outlet channel includes an inner port ring arranged on the inner port, rendering the diameter of the inner port smaller than the end of the water outlet channel opposite to the inner port, wherein the channel rod further comprises a rebound valve disposed at the opposite end of the channel rod connected with the end of the lever arm, and a rebound structure located between the rebound valve and the piston and abutting against the inner ring, wherein when the switch unit is in the open state, the rebound valve moves with the channel rod to abut and compress the rebound structure, wherein in the process of switching the switch unit from the open state to the closed state, the rebound structure is restored to push the rebound valve and then drive the channel rod to move the piston in the direction toward the inner port and close the inner port, thereby closing the water outlet channel.

Another object of the present invention is to provide a pet kettle, wherein the switch unit further comprises a force receiving plate, wherein the force receiving rod is abutted against the force receiving plate, and the transmission arm is connected with the force receiving plate, so that the force receiving rod and the transmission arm are capable of realizing force transmission through the force receiving plate.

Another object of the present invention is to provide a pet kettle, wherein the transmission arm and the lever arm are detachably connected magnetically, so as to facilitate the disassembly and cleaning of the pet kettle, thereby maintaining the hygienic state of the pet kettle.

Another object of the present invention is to provide a pet kettle, wherein the pet kettle further includes a handle disposed on the bottle body, so that the pet breeder may directly hold the pet kettle through the handle, thereby facilitating the carrying of the pet kettle.

Another object of the present invention is to provide a pet kettle, wherein the pet kettle further comprises a carry haft arranged on the bottle cap, so that the pet breeder may lift and hold the pet kettle through the carry haft, which facilitates the displacement of the pet kettle.

Another object of the present invention is to provide a pet kettle, wherein the pet kettle further includes a harness hole arranged on the bottle cap, so that the pet kettle can be installed with a corresponding harness through the harness hole, so that the pet breeder may carry the pet water bottle in a back-carrying manner, which further facilitates the carrying and transportation of the pet kettle.

According to an aspect of the present invention, the present invention provides a pet kettle, wherein the pet kettle comprises:
- a bottle body, wherein the bottle body has a cavity and an opening communicating the cavity with the outside, wherein the bottle body comprises a bottle cap matched with the opening, wherein the bottle cap is detachably attached with the opening;
- an object holding tray, wherein the bottle body comprises a tray groove arranged thereon, wherein the object holding tray is movably placed in the tray groove; and
- a switch unit, wherein the bottle body comprises a water outlet channel arranged toward the tray groove, wherein the switch unit is adapted to be switched to an open state or a closed state to open or close the water outlet channel.

According to an embodiment, the switch unit comprises a force receiving rod, a transmission arm, a lever arm, and a channel rod, wherein the force receiving rod and the transmission arm are force-conductively coupled, wherein two ends of the lever arm are respectively connected with the transmission arm and the channel rod, wherein the channel rod is arranged in the water outlet channel, wherein the channel rod comprises a piston arranged thereon, wherein the end of the water outlet channel facing the cavity is defined as an inner port, wherein when the switch unit is in the closed state, the piston is located in the inner port.

According to an embodiment, the switch unit further comprises a force receiving plate, wherein the force receiving rod is abutted against the force receiving plate, and the transmission arm is connected with the force receiving plate, so that the force receiving rod and the transmission arm are force-conductively coupled.

According to an embodiment, the switch unit further comprises a button connected with an end of the force receiving rod, so that an external force may be exerted to the force receiving rod through the button, in order to move the force receiving rod to open the water outlet channel.

According to an embodiment, the bottle cap comprises a pressing groove, wherein the button is arranged in the pressing groove, wherein the pressing groove has a pressing groove bottom, so as to adjust the pressing scale of the button based on the depth setting of the pressing groove.

According to an embodiment, the switch unit further comprises a button return member arranged at the pressing groove bottom and abutted against the button, wherein when the button is moved toward the direction close to the pressing groove bottom due to an external force, the button return member is squeezed, so that when the corresponding external force exerted to the button is removed, the button return member returns to an original state and pushes the button to move away from the pressing groove bottom.

According to an embodiment, the button return member is a spring.

According to an embodiment, the pressing groove bottom has a through hole arranged thereon, so as to allow the force receiving rod to be connected with the button through the through hole.

According to an embodiment, the bottle cap further comprises a button cover adapted for shielding the button.

According to an embodiment, the switch unit further comprises a waterproof ring, surroundingly arranged around the through hole.

According to an embodiment, the opening of the bottle body comprises an opening connecting portion surroundingly arranged near and around the opening, wherein the bottle cap comprises a bottle cap connecting portion matched with the opening connecting portion, wherein the bottle cap connecting portion of the bottle cap is adapted to be detachably attached with the opening connecting portion of the opening.

According to an embodiment, the opening connecting portion and the bottle cap connecting portion are provided as threads that match each other.

According to an embodiment, the transmission arm and the lever arm are detachably connected magnetically.

According to an embodiment, the object holding tray is arranged in a movable manner along the tray groove.

According to an embodiment, the water outlet channel comprises an inner port ring arranged on the inner port, rendering the diameter of the inner port smaller than the end of the water outlet channel opposite to the inner port.

According to an embodiment, the channel rod further comprises a rebound valve disposed at the opposite end of the channel rod connected with the end of the lever arm, and a rebound structure located between the rebound valve and the piston and abutted against the inner port ring, wherein when the switch unit is in the open state, the rebound valve abuts against and compresses the rebound structure, wherein in the process of switching the switch unit from the open state to the closed state, the rebound structure is restored to push the rebound valve and then drive the channel rod to move the piston toward the inner port and close the inner port.

According to an embodiment, the rebound structure is a spring.

According to an embodiment, the pet kettle further comprises a handle arranged on the bottle body to facilitate the carrying of the pet kettle.

According to an embodiment, the pet kettle further comprises a carry haft arranged on the bottle cap.

According to an embodiment, the pet kettle further comprises a harness hole arranged on the bottle cap, so as to allow the pet kettle to be installed with a corresponding harness through the harness hole.

According to another aspect of the present invention, the present invention further provides a water storage control method for pet kettle, wherein the water storage control method for pet kettle comprises the steps of:

(A) outputting the water:
 (a1) moving a force receiving rod through exerting an external force thereto;
 (a2) moving a transmission arm force-guidedly coupled with the force receiving rod with the force receiving rod;
 (a3) moving an end of a lever arm connected to the transmission arm with the transmission arm in the direction of movement toward the transmission arm, driving the other end of the lever arm to move in the direction opposite to the movement of the transmission arm, thereby driving a channel rod connected with the lever arm to move; and
 (a4) moving the channel rod so as to drive a piston arranged on the channel rod away from a water outlet channel, thereby controlling the water output of the pet kettle; and (B) turning off the water:
 (b1) stopping exerting external force to the force receiving rod; and
 (b2) rebounding a rebound structure arranged in the water outlet channel, thereby pushing a rebound valve disposed at the opposite end of the channel rod connected with an end of the lever arm, so as to move the channel rod to drive the piston to approach and close the water outlet channel.

Still further objects and advantages will become apparent from a consideration of the ensuing description and drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be exerted to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

In the description of the present invention, it should be noted that the terms "mounted," "connected," and "linked" should be understood in a general manner, which could be, for example, affixedly connected, detachably connected, or integrally connected. Unless expressly specified and defined otherwise, it may also be a mechanical connection, an electrical connection or may be in communication with each other; it may be directly connected or indirectly connected by means of an intermediate medium, and may be an interaction relationship between two or more elements inside the two elements. For a person of ordinary skill in the art, the specific meanings of the above terms in the present invention may be understood according to specific situations.

Referring to FIGS. 1-6 of the present application, a pet kettle according to an embodiment of the present invention is illustrated, wherein the pet kettle includes a bottle body 10, an object holding tray 20, and a switch unit 30, wherein the switch unit 30 is adapted to be switched to an open state or an closed state to control the liquid contained in the bottle body 10, such as pet drinking water, and etc. to flow out or stay in the bottle body 10, so as to avoid direct contact of the pet breeder with the water in the process of supplying water, thereby reducing health risks to the pet and the pet breeder.

In detail, the bottle body 10 has a cavity 15 and an opening 12 communicating the cavity 15 with the outside, so that the cavity 15 of the bottle body 10 may be utilized to contain and store articles through the opening 12, such as drinking water for pets, and at the same time, it is beneficial to clean the cavity 15 through the opening 12, so as to maintain the hygienic state of the pet kettle.

Further, the bottle body 10 includes a bottle cap 11 matched with the opening 12, so that the cavity 15 of the bottle body 10 may be switched between a sealed state and a communication state with the outside through the bottle cap 11. In this way, when the cavity 15 is in the sealed state, it is utilized to store articles and prevent the articles from being polluted by external dust, and etc., so as to ensure the hygiene of the articles stored in the cavity 15, and when the cavity 15 is in the communication state with the outside, it is adapted for cleaning the cavity 15 or storing articles. For example, the pet's drinking water may be poured into the cavity 15 when the cavity 15 is in the communication state with the outside.

Particularly, the bottle cap 11 and the opening 12 are attached and coupled in a detachable manner. Specifically, the opening 12 of the bottle body 10 includes an opening connecting portion 121 surroundingly disposed near and around the opening 12, wherein the bottle cap 11 includes a bottle cap connecting portion 111 matched with the opening connecting portion 121, wherein the bottle cap connecting portion 111 of the bottle cap 11 is adapted to be detachably attached to the opening connecting portion 121 of the opening 12. In this way, when the bottle cap connecting portion 111 and the opening connecting portion 121 are detachably attached, the articles stored in the cavity 15 are prevented from leaking through the opening 12.

It is worth mentioning that, according to one embodiment of the present invention, the opening connecting portion 121 and the bottle cap connecting portion 111 are set as threads that match each other, so that the detachable connection state of the bottle cap 11 and the opening 12 may be realized economically and conveniently, and have excellent water tightness to prevent leakage of the liquid placed in the cavity 15. Besides, according to some embodiments of the present invention, the opening connecting portion 121 and the bottle cap connecting portion 111 are arranged in other forms, such as, an airtight element that is allowed to be snapped, etc., which only needs to satisfy that the bottle cap connecting portion 111 and the opening connecting portion 121 are capable of being detachably attached.

In particular, the object holding tray 20 is arranged in the pet kettle in a hidden manner, so as to facilitate the carrying and transportation of the pet kettle. Specifically, the bottle body 10 further includes a tray groove 14 arranged therein, wherein the object holding tray 20 is movably placed in the tray groove 14, and according to this specific embodiment, the object holding tray 20 is allowed to move along the tray groove 14. In other words, the object holding tray 20 is allowed to be partially drawn out from the tray groove 14 to facilitate the pet's eating or drinking, and when the pet kettle is in a non-use state, the object holding tray 20 is allowed to be pushed into the tray groove 14, so as to realize the concealment of the object holding tray 20, to avoid the object holding tray 20 from being polluted by dust and bacteria due to direct exposure to the external environment, and simultaneously reduce the floor space of the pet kettle, thereby facilitating the storage of the pet kettle and the carrying and transportation of the pet kettle by the pet breeder.

It is worth mentioning that the object holding tray 20 is located in the tray groove 14, so that the object holding tray 20 is combined with the bottle body 10. Therefore, when the pet kettle is in a use state, the articles in the object holding tray 20, such as pet drinking water or pet food, are prevented from being polluted and wasted due to the object holding tray 20 being knocked over by the pet, and the hygiene of the object holding tray 20 can be maintained at the same time.

Figure 6:
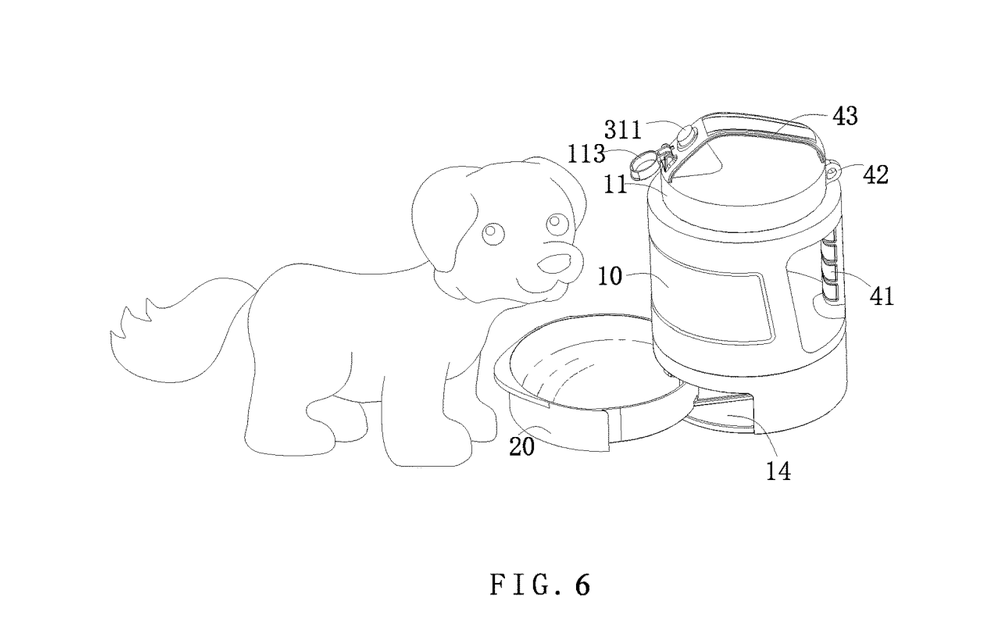
FIG. 6 is a perspective view illustrating another application scenario of the pet kettle according to the above preferred embodiment of the present invention.

For example, referring specifically to FIG. 6, another application scenario of the pet kettle is illustrated. In this application scenario, the object holding tray 20 is partially drawn out from the tray groove 14 to receive corresponding food or water for pets to eat or drink, and based on the structural design of the object holding tray 20 and the bottle body 10, especially when the liquid is placed in the cavity 15 of the bottle body 10, the overall weight of the pet kettle is increased. Therefore, when the pet is drinking water, it is difficult for the pet to overturn the object holding tray 20 when the pet plays near the pet kettle or collides with the pet kettle. Consequently, the articles in the object holding tray 20 are prevented from being polluted and wasted, and the object holding tray 20 is prevented from being overturned and soiled, and the hygiene of the object holding tray 20 may be maintained, and the energy required by pet breeders to clean the object holding tray 20 is saved.

In addition, it is also worth mentioning that the object holding tray 20 is allowed to be placed with pet food, so as to improve the practicability of the pet kettle, especially when pet breeders bring their pets out to play, the pet kettle may store the pet's drinking water and pet food, so as to meet the pet's water and dietary needs, thereby saving the energy of the pet breeders and giving them a good user experience.

Further, the bottle body 10 further includes a water outlet channel 13, wherein the water outlet channel 13 is arranged in a direction toward the tray groove 14, so that the liquid stored in the cavity 15 may flow into the storage tray 20 placed in the tray groove 14 through the water outlet channel 13, for the pets to drink. That is to say, with the water outlet channel 13, the pet water bottle does not need to be tilted to realize water supplying, so as to save the pet breeders a lot of physical strength in performing the water supplying operation, so that the pet water bottle is easy to use, and the energy of pet keepers is saved.

It is worth mentioning that the pet kettle can prevent pet breeders from directly contacting the water during the process of supplying water, thereby reducing the health risk of pets and pet breeders. Specifically, the switch unit 30 is arranged on the bottle body 10 and is adapted to be switched to the open state or the closed state, in order to control the water outlet channel 13 to be opened or closed, so that the water outlet channel 13 is allowed or prohibited to flow water, so as to realize the control of the water storage by the pet breeder.

In detail, the switch unit 30 includes a force receiving rod 31, a transmission arm 32, a lever arm 33, and a channel rod 34, wherein the force receiving rod 31 and the transmission arm 32 are force-conductively coupled, wherein two ends of the lever arm 33 are respectively connected to the transmission arm 32 and the channel rod 34, wherein the channel rod 34 is located in the water outlet channel 13, wherein the channel rod 34 includes a piston 341 arranged thereon, wherein when the switch unit 30 is in the closed state, the piston 341 seals and closes the water outlet channel 13.

Specifically, the water outlet channel 13 has an inner port 131 facing an end of the cavity 15, wherein when the switch unit 30 is in the closed state, the piston 341 is located in the inner port 131 to form a state in which the piston 341 seals and closes the water outlet channel 13.

For further understanding of the present invention, the present invention also includes the opening process of the switch unit 30, that is, the process of switching the switch unit 30 from the closed state to the open state, wherein the lever arm 33 includes a first connection end 331 connected to the transmission arm 32 and a second connection end 332 corresponding to the first connection end 331, wherein the force receiving rod 31 is applied with an external force, so that the force receiving rod 31 moves in the direction toward the tray groove 14, thereby driving the transmission arm 32 to move in the same direction. In response, the first connecting end 331 of the lever arm 33 moves with the transmission arm 32 in the direction toward the tray groove 14, and the second connecting end 332 moves in the direction away from the tray groove 14 and drives the channel rod 34, so that the piston 341 moves in the direction away from the inner port 131, so that the water outlet channel 13 is opened.

It is worth mentioning that the switch unit 30 may be automatically switched from the open state to the closed state, so that the water outlet channel 13 is closed, and pet breeders may effectively control the flow of water, so as to avoid waste and pollution of water resources.

Specifically, the channel rod 34 further includes a rebound structure 342 and a rebound valve 343, wherein the water outlet channel 13 includes an inner port ring 132, wherein the inner port ring 132 is arranged on the inner port 131, and the diameter of the inner port 131 is smaller than the end of the water outlet channel 13 opposite to the inner port 131, wherein the rebound valve 343 is arranged at the opposite end of the channel rod 34 connected to the end of the lever arm 33, wherein the rebound structure 342 is located between the rebound valve 343 and the piston 341 and abutted against the inner port ring 132, wherein when the switch unit 30 is in the open state, the rebound valve 343 moves with the channel rod 34 to abut and compress the rebound structure 342, wherein when the switch unit 30 is switched from the open state to the closed state, the rebound structure 342 is restored to push the rebound valve 343 to drive the channel rod 34 to move, so that the piston 341 moves toward the inner port 131 and closes the inner port 131, thereby closing the water outlet channel 13.

That is to say, when the external force exerted to the force receiving rod 31 is withdrawn, the rebound structure 342 will be restored due to its elasticity, and simultaneously push the rebound valve 343 abutted against the rebound structure 342 to move, thereby driving the channel rod 34 to move, and causing the piston 341 to move with the channel rod 34, specifically in a direction toward the inner port 131, so that the switch unit 30 may be automatically switched from the open state to the closed state.

It is worth mentioning that, according to this embodiment of the present invention, the rebound structure 342 is implemented as a spring, wherein the elastic force generated by the compression of the rebound structure 342 may overcome the pressure of the liquid stored in the cavity 15 flowing through the water outlet channel 13, and then can be restored, thereby driving the piston 341 to close the inner port 131. According to other embodiments of the present invention, the rebound structure 342 is configured as other elastic elements; that is, the specific implementation of the rebound structure 342 can be various, as long as the rebound structure 342 may be compressed to generate an elastic force sufficient to overcome the water pressure.

Additionally, the switch unit 30 further comprises a force receiving plate 35, wherein the force receiving rod 31 is abutted against the force receiving plate 35, and the transmission arm 32 is connected to the force receiving plate 35, so that the force receiving rod 31 and the transmission arm 32 are capable of realizing force transmission through the force receiving plate 35, so as to form a state in which the force receiving rod 31 and the transmission arm 32 are force-conductively coupled, which facilitates both the disassembling and the cleaning of the pet kettle. It is worth mentioning that the force receiving plate 35 is located in the opening 12 of the bottle body 10, and the force receiving plate 35 is hollowed out, so that in the case of excessive water storage in the cavity 15 of the bottle body 10, the force plate 35 floats up to form a prompt for the pet breeder, so as to avoid overloading the bottle body 10 for storing water.

In particular, according to some embodiments of the present invention, the force receiving rod 31 and the transmission arm 32 are integrally formed. In addition, according to other embodiments of the present invention, the force receiving rod 31 and the transmission arm 32 are affixedly connected; that is, as long as the force receiving rod 31 and the transmission arm 32 are force-conductively coupled, the present invention shall not be limited here.

Further, the switch unit 30 includes a button 311, wherein an end of the force receiving rod 31 is connected to the button 311, so that the pet breeder may apply an external force to the force receiving rod 31 through the button 311, so as to drive the force receiving rod 31 to control the water outlet channel 13 to be opened.

Figure 1:
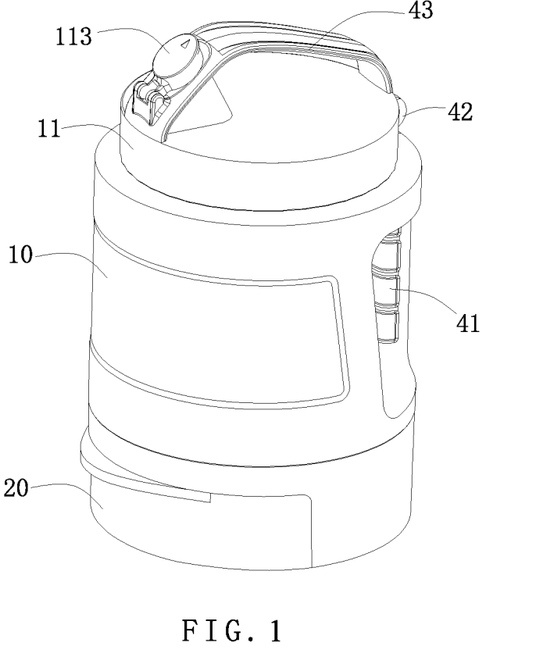
FIG. 1 is a perspective view of a pet kettle according to an embodiment of the present invention.
Figure 2:
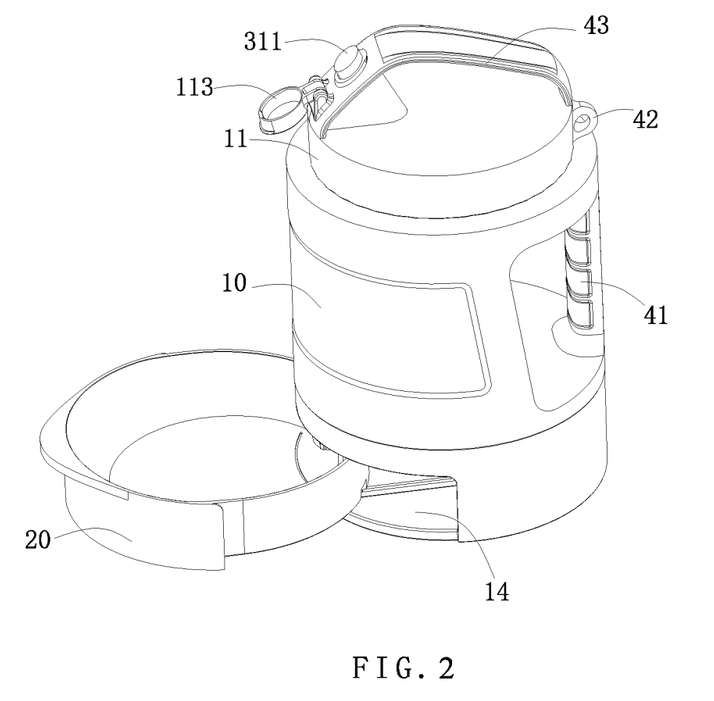
FIG. 2 is a perspective view illustrating a collapsed state of the pet kettle according to the above preferred embodiment of the present invention.
Figure 3:
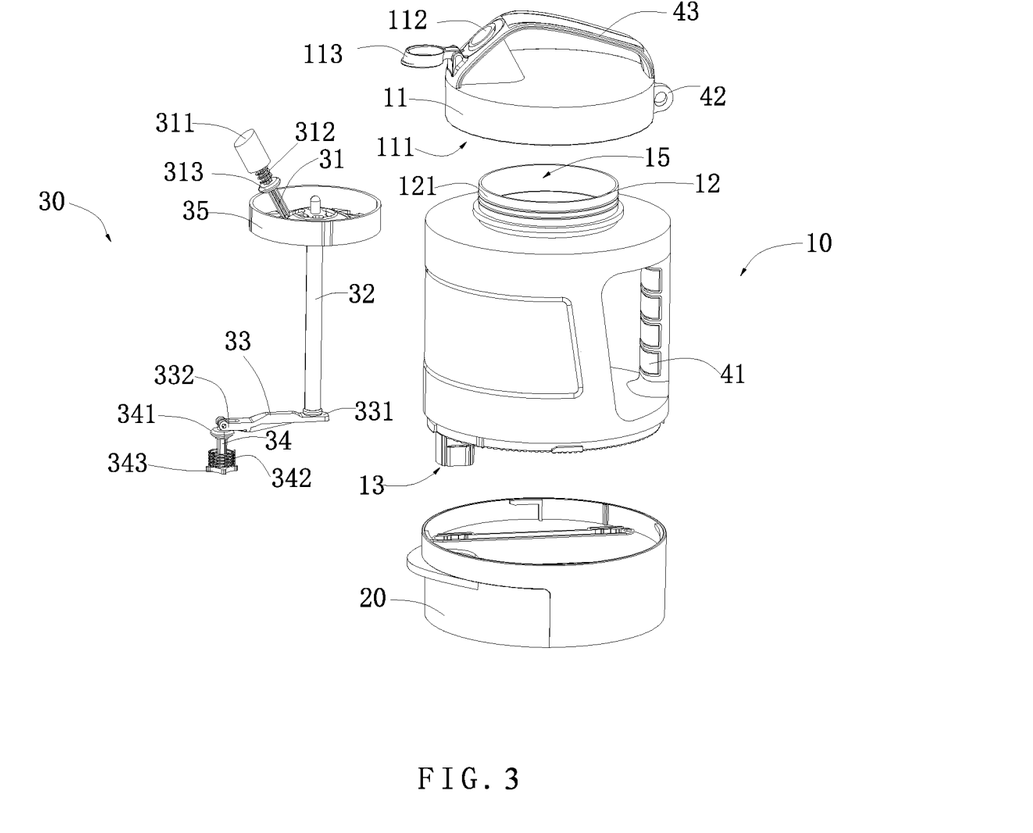
FIG. 3 is an exploded view illustrating the disassembly of the structure of the pet kettle according to the above preferred embodiment of the present invention.
Figure 4:
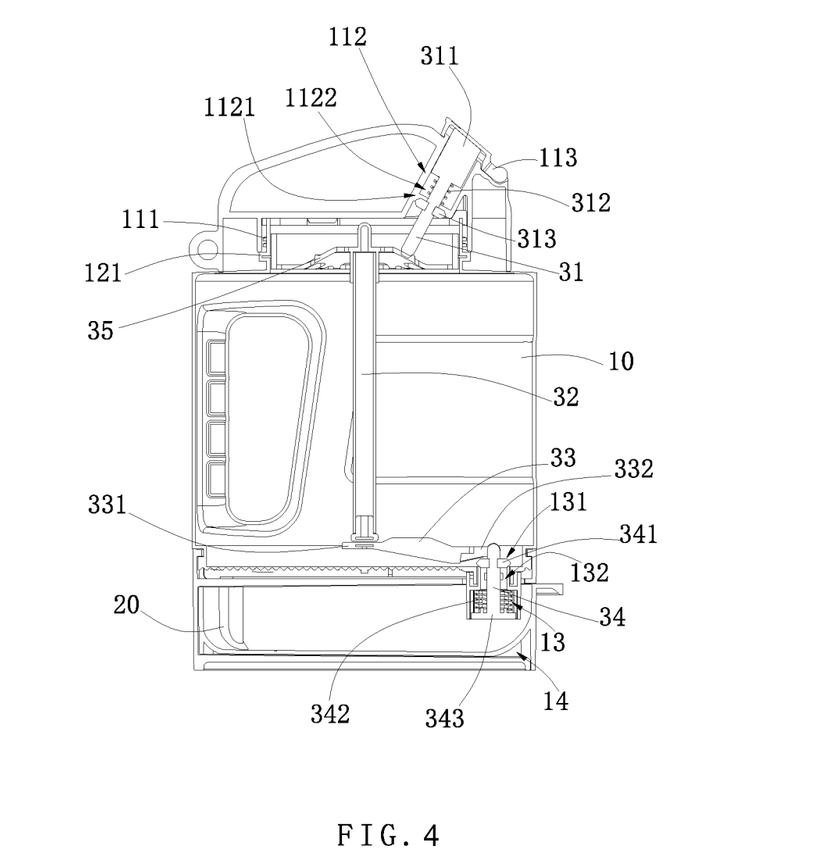
FIG. 4 is a sectional view of the pet kettle according to the above preferred embodiment of the present invention.
Figure 5:
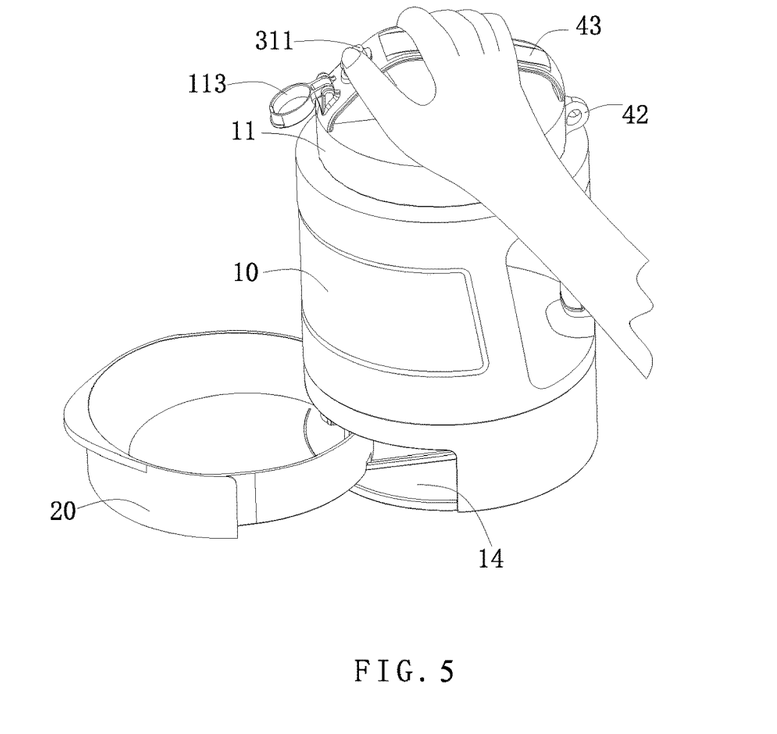
FIG. 5 is a perspective view illustrating an application scenario of the pet kettle according to the above preferred embodiment of the present invention.

For example, referring specifically to FIG. 5, an application scenario of the pet kettle is illustrated, wherein the button 311 of the pet kettle is pressed by the pet breeder, so that the force receiving rod 31 connected with the button 311 moves, and then drives the force receiving plate 35, the transmission arm 32, the lever arm 33, and the channel rod 34. In response, the piston 341 is away from the inner port 131, so that the water outlet channel 13 is opened, and the liquid stored in the cavity 15 of the bottle body 10 flows out to the object holding tray 20 through the water outlet channel 13.

Further exemplarily, as shown in FIG. 6, the object holding tray 20 is partially drawn out from the tray groove 14, and the pet breeder presses the button 311 to have the liquid stored in the cavity 15 of the bottle body 10 flow out to the object holding tray 20 through the water outlet channel 13, so as to allow the pet to drink water. At the same time, it prevents the pet breeder from using the inclined method to pour water, so as to avoid the pet keeper spending a lot of physical efforts to perform the water supplying operation, so that the pet kettle is easy to use and capable of saving the energy of the pet breeder. Also, with the design that the switch unit 30 can automatically switch from the open state to the closed state to close the water outlet channel 13 in time, the pet breeders can accurately control the amount of liquid flowing into the object holding tray 20 according to the pet's watering demand, so as to avoid the waste of water resources.

It is worth mentioning that the pet breeder may apply the external force to the force receiving rod 31 through the button 311, and then control the opening of the water outlet channel 13 to allow the liquid in the cavity 15 flow out to the object holding tray 20 through the water outlet channel 13, so as to prevent the pet breeder from contacting the liquid in the process of supplying the liquid to the object holding tray 20, thereby avoiding the transmission of bacteria or other harmful substances to the pet through the pet owner. After use, the object holding tray 20 may be pushed into the tray groove 14, and the pet breeders do not need to directly contact the object holding tray 20 when carrying the pet kettle, which ensures the health and safety of the pet and the pet breeder.

In particular, the bottle cap 11 includes a pressing groove 112, wherein the button 311 is disposed in the pressing groove 112, wherein the pressing groove 112 has a pressing groove bottom 1121 arranged therein, so that the pressing depth of the button 311 is adjustable based on the depth of the pressing groove 112, which realizes the control of the movement extent of the force receiving rod 31, thereby controlling the distance of the piston 341 from the inner port 131, wherein the pressing groove bottom 1121 has a through hole 1122 disposed thereon, so that the force receiving rod 31 is connected to the button 311 through the through hole 1122, so that the pet breeder may apply an external force to the force receiving rod 31 through the button 311, to move the force receiving rod 31 to control the water outlet channel 13 to open.

It is worth mentioning that the bottle cap 11 further includes a button cover 113 adapted for shielding the button 311, so as to prevent the button 311 from being accidentally touched and the water outlet channel 13 being opened, which is further conducive to the carrying and transportation of the pet kettle. In addition, with the shielding of the button cover 113, the risk of dust and the like entering the pressing groove 112 is reduced, which maintains the hygienic state of the pet kettle.

In particular, the switch unit 30 further includes a button return member 312 disposed on the pressing groove bottom 1121 and abutting against the button 311, wherein when the button 311 is moved toward the direction close to the pressing groove bottom 1121 by an external force, the button return member 312 will be squeezed, and then when the corresponding external force exerted to the button 311 is removed, the button return member 312 will return to an original state to push the button 311 to move away from the pressing groove bottom 1121, so that the button 311 will be returned to an original position, thereby driving the force receiving rod 31 to move and to save the time of an water outlet cycle. Specifically, after the pet breeder presses the button 311 once, the button 311 may be quickly returned based on the button return member 312, so that the pet breeder may press the button 311 again.

It is worth mentioning that, according to this embodiment of the present invention, the button return member 312 is a spring, so that the return of the button 311 can be realized conveniently and reliably. According to other embodiments of the present invention, the button return member 312 may be set to other elastic elements with restoring characteristics; that is, the specific implementation of the button return member 312 may be various.

In particular, the switch unit 30 further includes a waterproof ring 313 arranged around the through hole 1122, wherein when the force receiving rod 31 is connected with the button 311 through the through hole 1122, the liquid stored in the cavity 15 of the bottle body 10 is prevented from leaking through the gap between the through hole 1122 and the force receiving rod 31 through the waterproof ring 313, thereby the sealing performance of the cavity 15 is enhanced, which facilitates the carrying and transportation of the pet toy.

It is worth mentioning that, according to some embodiments of the present invention, the button 311 is arranged on the bottle body 10. Specifically, the button 311 is designed in the form of a pick and arranged on the bottle body 10. The pet breeder drives the force receiving rod 31 to move by toggling the button 311, which is designed as the pick, thereby driving the force receiving plate 35, the transmission arm 32, the lever arm 33, and the channel rod 34 to control the opening and closing of the water outlet channel 13. Therefore, the present invention shall not be limited here.

Further, according to this embodiment of the present invention, the transmission arm 32 and the lever arm 33 are detachably connected magnetically, so as to facilitate the disassembly and cleaning of the pet kettle, thereby maintaining the hygienic state of the pet kettle. According to other embodiments of the present invention, the transmission arm 32 and the lever arm 33 may be connected in other ways, such as an integrally formed affixed connection. Therefore, the present invention shall not be limited here.

In particular, in order to further facilitate the carrying of the pet kettle, the pet water further comprises a handle 41, wherein the handle 41 is arranged on the bottle body 10, so that the pet breeder may directly hold the pet kettle through the handle 41. For example, in the process of carrying the pet kettle, the pet owner may directly carry the pet kettle by holding the handle 41, which is simple and easy to implement, and capable of avoiding soil or dust from being contaminated on the surface of the pet water bottle after outdoor use, which contaminates the pet keeper's backpack because the pet kettle is placed in the backpack, so as to avoid aggravating the energy consumption of the pet breeder.

It is worth mentioning that the pet water bottle further includes a carry haft 42 arranged on the bottle cap 11, so that the pet breeder may hold the pet kettle through the carry haft 42, so as to facilitate the displacement of the pet kettle. Specifically, based on the carry haft 42, the pet keeper can lift the pet kettle, so as to facilitate the situation that the pet kettle needs to be adjusted in time due to the running of the pet, for example, in an outdoor scenario.

In addition, it is also worth mentioning that the pet kettle further includes a harness hole 43 disposed in the bottle cap 11, so that the pet water bottle can be installed with a corresponding harness through the harness hole 43. In this way, the pet breeder can carry the pet kettle in a back-carriage manner, which further facilitates the carrying and transportation of the pet kettle.

That is to say, the pet water bottle has an integrated structure, which is convenient for carrying and transportation. At the same time, it is easy to use to save the pet breeder a lot of physical efforts in supplying water and save the pet breeder energy. Besides, the pet breeder does not need to directly contact the water stored in the pet kettle during the process of supplying water, thereby reducing the health risk of the pet and the pet breeder.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pet kettle, comprising:
   a bottle body, wherein said bottle body has a cavity and an opening communicating said cavity with the outside, wherein said bottle body comprises a bottle cap matched with said opening, wherein said bottle cap is detachably attached with said opening;
   an object holding tray, wherein said bottle body further comprises a tray groove arranged thereon, wherein said object holding tray is movably placed in said tray groove; and
   a switch unit, wherein said bottle body further comprises a water outlet channel arranged toward said tray groove, wherein said switch unit is adapted to be switched to an open state or a closed state to open or close said water outlet channel, wherein said switch unit comprises a force receiving rod, a transmission arm, a lever arm, and a channel rod, wherein said force receiving rod and said transmission arm are force-conductively coupled, wherein two ends of said lever arm are respectively connected with said transmission arm and said channel rod, wherein said channel rod is arranged in said water outlet channel, wherein said channel rod comprises a piston arranged thereon and a rebound structure, wherein the end of said water outlet channel facing said cavity is defined as an inner port, wherein when said force receiving rod is applied with a force from a pet breeder, said lever arm is driven by said transmission arm to move so as to drive the channel rod to move, so that said piston is moved away from said inner port to allow water in said cavity to flow into said object holding tray, wherein said object holding tray is allowed to be partially drawn out from said tray groove in a manner that a part of said object holding tray is retained at an inner side of said water outlet channel, wherein when said force receiving rod is released, said rebound structure is restored to drive said piston to close said inner port, so that said switch unit is switched from the open state to the closed state, wherein said channel rod further comprises a rebound valve disposed at the opposite end of said channel rod connected with the end of said lever arm, and said rebound structure located between said rebound valve and said piston and abutted against an inner port ring, wherein when said switch unit is in the open state, said rebound valve abuts against and compresses said rebound structure, wherein in the process of switching said switch unit from the open state to the closed state, said rebound structure is restored to push said rebound valve and then drive said channel rod to move said piston toward said inner port and close said inner port.

2. The pet kettle, as recited in claim 1, wherein said rebound structure is a spring.

* * * * *